J. C. FOX.
CYCLE FOOT REST.
APPLICATION FILED AUG. 27, 1914.

1,176,673.

Patented Mar. 21, 1916.

Witnesses
James E. Sproll.
N. M. Brooks

Inventor
Joseph C. Fox.

By Adams & Brooks
Attorneys

UNITED STATES PATENT OFFICE.

JOSEPH C. FOX, OF SEATTLE, WASHINGTON, ASSIGNOR TO FOX MANUFACTURING COMPANY, OF SEATTLE, WASHINGTON, A CORPORATION OF WASHINGTON.

CYCLE FOOT-REST.

1,176,673.      Specification of Letters Patent.      Patented Mar. 21, 1916.

Application filed August 27, 1914. Serial No. 858,888.

*To all whom it may concern:*

Be it known that I, JOSEPH C. FOX, a citizen of the United States of America, and a resident of the city of Seattle, in the county of King and State of Washington, have invented certain new and useful Improvements in Cycle Foot-Rests, of which the following is a specification.

This invention relates particularly to a step attachment for a tandem seat of a bicycle, especially of the motorcycle type, and it has for its primary aim to provide a novel step which may be moved out of the way when not in use.

Further objects reside in the features of construction, arrangements and combinations of parts which are set forth in the specification and defined in the appended claims in a succinct manner.

Figure 1:
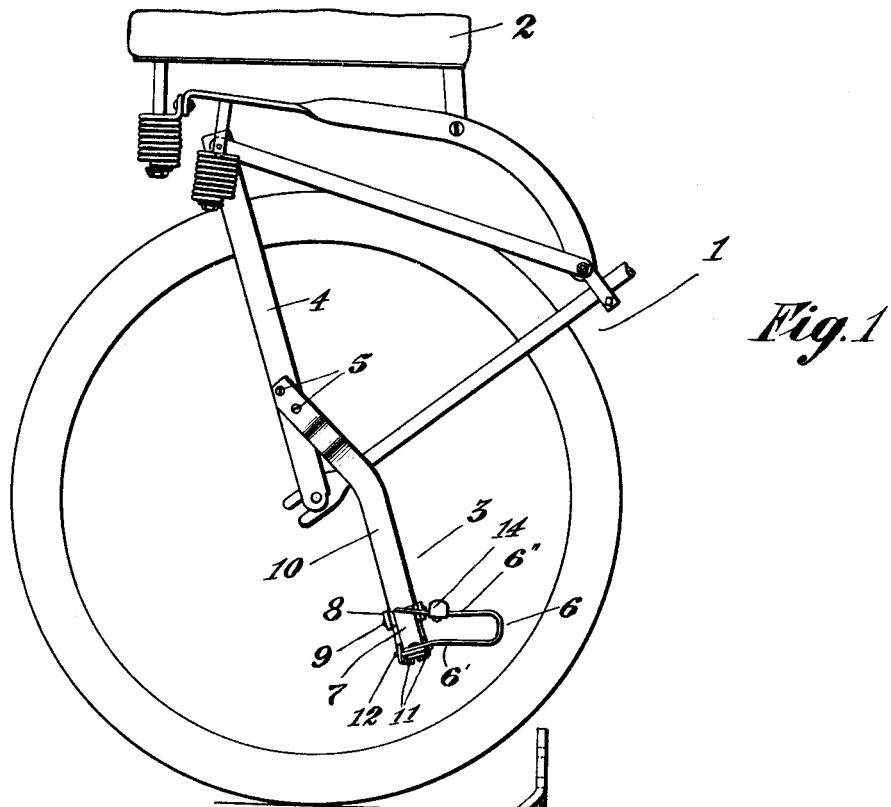
Figure 2:
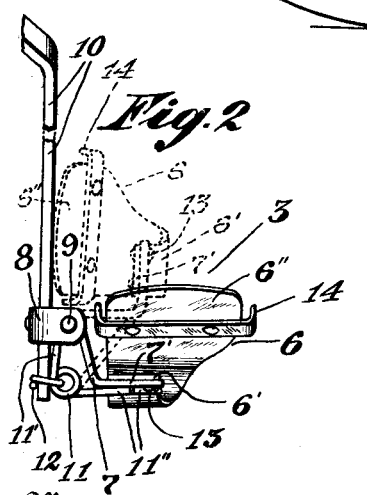
Figure 3:
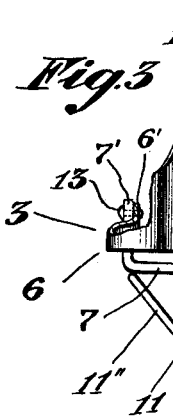
Figure 4:
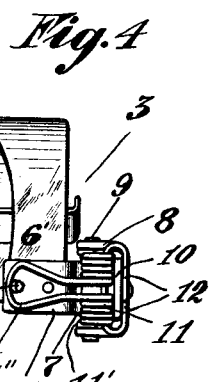

For a full understanding of the invention reference is to be had to the following description and the accompanying drawings wherein:

Figure 1 shows, in side elevation, my invention attached to a tandem seat attachment. Fig. 2 is a rear elevation of my improved step showing the same in its operative position in full lines and, in dotted lines, the step folded against its support. Fig. 3 is a front elevation of the step in its operative position, portions being omitted, and Fig. 4 is a bottom plan view of the step as shown in Fig. 1.

Referring by similar characters of reference to corresponding parts throughout, 1 designates a fragmentary portion of a bicycle or motorcycle having a tandem or rear seat 2 attached thereto, and 3 denotes my improved step, one being disposed on each side of the rear wheel and secured to upright support 4 of the tandem seat, as by fasteners 5.

My step comprises a resilient or yieldable foot rest 6 fixed to the horizontal arm 7′ of a bracket 7 which is mounted between the arms of U-shaped member 8, as by pin 9, for swinging vertically against the step support 10 to an inoperative position where it is retained by spring element 11. Member 8 is carried by step support 10 and spring 11 is secured to bar 10 by a loop 12 and has its terminals 11′ straddling bracket 7 and engaging about the pivot pin 9. The central portion 11″ of the spring is in the form of a widened loop for engaging over a stud or catch 13, on the underside of bracket arm 7′, for retaining the foot rest in a horizontal or operative position, said stud also serving to secure the foot rest to the bracket.

The foot rest 6 is formed of a single piece of spring metal having a narrow portion 6′ which is secured to the bracket 7 and widens into the foot supporting section 6″. Section 6″ is bent back over portion 6′ in spaced relation thereto, terminating directly over bracket 7, and carries a cleat 14 extending upwardly on each side to prevent lateral movement of the foot.

The foregoing detailed description has been given for clearness of understanding only, and no undue limitation is to be understood therefrom, but the appended claims are to be construed as broadly as is permissible in view of the prior art.

Having thus described my invention, what I claim as new, and desire to secure by Letters Patent of the United States of America, is:

1. The combination with a folding foot rest for bicycles, of a spring acting on said rest to support it and to throw it into folded position, and a catch, releasable under shock, for holding the rest in extended position.

2. The combination with a folding foot rest for bicycles, of a spring acting on said rest to support it and to throw it into folded position, and a catch carried by the foot rest and engaging the spring to prevent upward movement of the rest beyond its normal position, and releasable under shock.

3. A folding foot rest for cycles comprising a bar pivoted to swing in a substantially vertical plane, a spring acting thereon to throw it into closed position, and means releasable under a blow acting to hold the rest in extended position.

4. A folding foot rest for cycles comprising a bar pivoted to swing into horizontal and vertical positions, a spring pressing upward and inward upon the bar, said bar and spring having interlocking parts preventing upward movement of the bar beyond its position of use under normal conditions.

5. In a foot rest for bicycles, in combination, a pivoted arm, a spring forming a yielding support for the arm, and a spring member carried by the arm and serving as the foot engaging and supporting member.

6. In a foot rest for bicycles, in combination, a pivoted arm, a spring forming a yielding support for the arm, a catch normally holding the arm in an extended position above the lowermost limit of its movement and releasable under shock, and a spring member carried by the arm and forming the foot support.

7. The combination with a support, of a step pivoted thereon for movement to and from an inoperative position, a coiled spring secured to said support below the pivot of said step and having a laterally projecting arm bearing upwardly against said step, and a catch carried by the step and engaging the spring arm to hold the step in operative position, said catch being releasable by a shock.

8. The combination with a support, of a step pivoted thereon for movement to and from an inoperative position, a coil spring secured to said support, an arm projecting from said spring and bearing against said step, said arm tending to hold said step in inoperative position, and a catch on said step engageable with said arm to hold the step in operative position.

9. The combination with a support, of a substantially L-shaped bracket pivoted thereon by one end, the other end of said bracket being horizontal when in operative position, said bracket being adapted to be swung upward into inoperative position, a step secured to said bracket, a coil spring secured to said support about the level of said lower arm of the bracket when same is in operative position, an arm extending from said spring and engageable with said bracket, and tending to hold the latter in inoperative position, and a catch upon said bracket engageable with said arm to hold the bracket in operative position.

10. In a foot rest for cycles, in combination, a supporting bar adapted to be secured to the cycle and having a pair of opposed pivot ears, an arm pivoted between said ears and bent into substantially an L-shape, the pivot being at an outer end of one arm, a foot engaging member secured to the other arm, a coiled spring secured to the supporting arm beneath the pivot ears with its axis paralleling the pivot axis of the pivoted arm and substantially at the level of the outer half of said L-shaped arm when said half is horizontal, the spring having an arm formed by a loop therein extending under the outer half of said pivoted arm, said pivoted arm having a projecting catch which enters the loop in said spring arm when the pivoted arm is lowered into operative position, the end of said spring arm engaging the bend of the pivoted arm when the latter is thrown up.

Signed at Seattle, Washington this 6th day of August 1914.

JOSEPH C. FOX.

Witnesses:
 GEO. D. EMERY,
 E. ARLITA ADAMS.

Copies of this patent may be obtained for five cents each, by addressing the "Commissioner of Patents, Washington, D. C."